United States Patent
Pavelic

(10) Patent No.: US 11,343,601 B2
(45) Date of Patent: May 24, 2022

(54) PORTABLE SOLAR POWERED SMART SPEAKER SYSTEM

(71) Applicant: Aloha Corporation, Urbandale, IA (US)

(72) Inventor: Srdjan Pavelic, Urbandale, IA (US)

(73) Assignee: ALOHA CORPORATION, Urbandale, IA (US)

(*) Notice: Subject to any disclaimer, the term of this patent is extended or adjusted under 35 U.S.C. 154(b) by 30 days.

(21) Appl. No.: 16/879,118

(22) Filed: May 20, 2020

(65) Prior Publication Data

US 2020/0351579 A1    Nov. 5, 2020

Related U.S. Application Data

(63) Continuation of application No. 16/058,560, filed on Aug. 8, 2018, now abandoned.

(Continued)

(51) Int. Cl.
*H04R 1/02* (2006.01)
*H04R 1/28* (2006.01)
(Continued)

(52) U.S. Cl.
CPC ........... *H04R 1/025* (2013.01); *H04R 1/2857* (2013.01); *H04R 5/02* (2013.01); *H02S 99/00* (2013.01);
(Continued)

(58) Field of Classification Search
CPC .............................. H04R 1/025; H04R 1/2819
See application file for complete search history.

(56) References Cited

U.S. PATENT DOCUMENTS

| 5,092,424 A | 3/1992 | Schreiber et al. |
| 7,668,331 B2 * | 2/2010 | Yen .................. H04R 1/403 381/349 |

(Continued)

FOREIGN PATENT DOCUMENTS

JP        6205488 A    7/1994

OTHER PUBLICATIONS

Wikipedia, "Helmholtz resonance", https://en.wikipedia.org/wiki/helmholtz_resonance, 3 pages, accessed Sep. 25, 2018.

(Continued)

*Primary Examiner* — Ping Lee
(74) *Attorney, Agent, or Firm* — McKee, Voorhees & Sease, PLC

(57) ABSTRACT

A portable speaker system includes a tunnel with at least one internal speaker facing inwardly into the tunnel such that acoustic resonance amplifies desirable frequencies of sounds emitted by the internal speaker. The portable speaker system includes solar panels and is waterproof. A display touch screen permits operation of the speaker system. The portable speaker system is adapted to receive input of audio files from a variety of sources. A non-transitory storage medium permits storage of the audio files and a CPU is programmed to permit playback of audio files in a desired sequence or from a desired live-streaming source. The smart speaker can utilize Bluetooth, Wi-Fi, and/or telecommunication connectivity to receive and/or play audio files, and can queue files from multiple sources for playback.

11 Claims, 7 Drawing Sheets

Related U.S. Application Data

(60) Provisional application No. 62/542,642, filed on Aug. 8, 2017.

(51) Int. Cl.
*H04R 5/02* (2006.01)
*H04R 1/44* (2006.01)
*H02S 99/00* (2014.01)

(52) U.S. Cl.
CPC ............... *H04R 1/023* (2013.01); *H04R 1/44* (2013.01); *H04R 2201/028* (2013.01); *H04R 2420/07* (2013.01); *H04R 2420/09* (2013.01); *H04R 2499/11* (2013.01)

(56) References Cited

U.S. PATENT DOCUMENTS

| | | | |
|---|---|---|---|
| 2005/0129258 A1* | 6/2005 | Fincham | H04S 3/002 381/160 |
| 2009/0245561 A1 | 10/2009 | Litovsky et al. | |
| 2014/0341394 A1 | 11/2014 | Croft, III | |
| 2016/0219367 A1 | 7/2016 | Florczak et al. | |
| 2016/0299736 A1 | 10/2016 | Bates et al. | |
| 2017/0230739 A1* | 8/2017 | Soofer | H04R 1/44 |

OTHER PUBLICATIONS

Wikipedia, "Helmholtz resonance", https://en.wikipedia.org/wiki/helmholtz_resonance, 5 pages, accessed Jul. 22, 2019.
Kinsler et al., "Pipes, Resonators and Filters", Fundamentals of Acoustics, Fourth Edition, Chapter 10, pp. 272-274, 2000.
Sonos, "Sub-Wireless Subwoofer", https://www.sonos.com/en-us/shop/sub.html; pp. 1-79, accessed Aug. 22, 2018.

\* cited by examiner

PORTABLE SOLAR POWERED SMART SPEAKER SYSTEM

CROSS REFERENCE TO RELATED APPLICATIONS

This application is a Continuation Application of U.S. Ser. No. 16/058,560, filed on Aug. 8, 2018, which claims priority to U.S. Provisional Patent Application No. 62/542,642 filed Aug. 8, 2017, the entire contents of which are hereby incorporated by reference in their entirety for all reasons.

FIELD OF THE INVENTION

The present invention relates to portable speaker systems for personal use.

BACKGROUND OF THE INVENTIONS

Portable speaker systems have been used in the electronics industry to allow users to be increasingly mobile in where and when they are able to enjoy audio listening. For example, stationary speakers are generally confined to their initial placement for a variety of reasons. These include a need of a power supply, weight, size, etc. Portable speakers, however, are generally lighter and smaller in size than a traditional speaker system, and may allow a user to play music without a need for connection to power.

Because portable speaker systems do not generally use a traditional supply of power such as an electrical outlet, it becomes necessary to find an alternative source. One method may be to use batteries, such as lithium ion, to provide a source of power to the system. However, this requires the user to manually change the batteries after a certain period of time and requires an ongoing financial commitment in order to supply power to the speaker system.

Alternatively, solar panels allow for a power source that does not require any external power supply outside of the sun. This allows users to take the portable speaker with them outside or to different environments without a need for an external power supply or change in batteries. However, if a user does not charge the speaker or is not using the speaker in an area where there is an availability of sunlight, there may not be a way for the user to provide power to the system, such as not being able to plug the device into an electrical outlet to charge batteries, such as lithium ion batteries.

Speaker systems are used to project audio. Bluetooth, internet, Wi-fi, internal storage, an auxiliary cord, etc. are examples of ways in which a speaker system can process and stream audio from a music source.

Another aspect of a portable speaker system includes the shape of the housing. Generally, speaker systems come in the traditional rectangular or spherical shape, which includes the common feature of external speakers. This results in sound that is neither acoustically driven nor amplified.

Other portable speaker systems are waterproof and can also include the ability to float instead of being submerged. This allows users to bring the speaker with when they are near or around water.

Therefore, there is a need in the art for a portable speaker system that is fully self-sustainable and capable of being used in all locations. There is also a need in the art for a speaker system that provides a more amplified and acoustic sound by providing internal speakers. There is a further need for a speaker system that connects to telecommunication providers for wireless connectivity.

BRIEF SUMMARY OF THE INVENTION

It is therefore a primary object, feature, and/or advantage of the present invention to provide a portable speaker system that overcomes deficiencies in the art.

It is another object, feature, and/or advantage of the present invention to provide a speaker system that is self-sustaining through solar power and a secondary power source such as rechargeable lithium ion batteries.

It is another object, feature, and/or advantage of the present invention to provide a speaker system that has Wi-Fi capabilities including a Wi-Fi Operating System that allows a user to stream audio.

It is another object, feature, and/or advantage of the present invention to provide a speaker system that has Bluetooth, Wi-Fi, and Wireless Telecommunications capabilities including an Android Operating System that allows a user to stream audio.

It is another object, feature, and/or advantage of the present invention to provide a speaker system that has the additional option of internal storage to allow the user to stream audio when there is a lack of available streaming capabilities.

It is another object, feature, and/or advantage of the present invention to provide a unique shape allowing for the configuration of internal speakers which results in a more amplified and acoustic sound.

It is another object, feature, and/or advantage to provide a speaker system that has the waterproof and float-ability capabilities to withstand different environments, locations, and water exposure.

According to one embodiment, the present disclosure shows and describes a portable speaker system having a housing with a lower base adapted to be supported on an upward facing surface, a first side portion and a second side portion each extending generally upwardly from opposite edges of the lower base, first and second end portions each extending generally upwardly from opposite edges of the lower base and spanning between opposed ends of the first and second side portions. A continuous internal surface extends from an outer surface of the first end portion to an outer surface of the second end portion to form an acoustic tunnel between the end portions. At least one internal speaker faces inwardly into the acoustic tunnel oriented generally normally to the continuous internal surface to create acoustic resonance. The portable speaker system may include a display screen located on the first side portion of the housing. The portable speaker system may also have a computer processing unit including a non-transitory memory within the housing operably connected to the display screen and the at least one speaker. A receiver and transmitter may wirelessly communicate with a first external user device, a second external user device, and a third external user device. The computer processing unit may be adapted to queue audio signals from each of the three external user devices in a desired order and play audio signals received from each of the three external devices in the desired order without creating a copy of an audio file. Receivers and transmitters may permit communication via Bluetooth, Wi-Fi, or cellular telecommunication. The first external device sends an audio signal from a first commercial music streaming app, the second external device sends an audio signal from a second commercial music streaming app, and the third external device sends an audio signal from a third commercial music streaming app. The portable speaker system may also include at least one solar panel located at an upper portion of the second side portion of the housing. An external speaker may be provided that faces outwardly from the housing. The housing may be waterproof and lighter than water such that it will float and may be weighted such that the speaker system will orient itself with the internal speaker facing upward above the water when floating. The tunnel may have a length and effective diameter that creates acoustic resonance to amplify desired sound frequencies.

Figure 1:
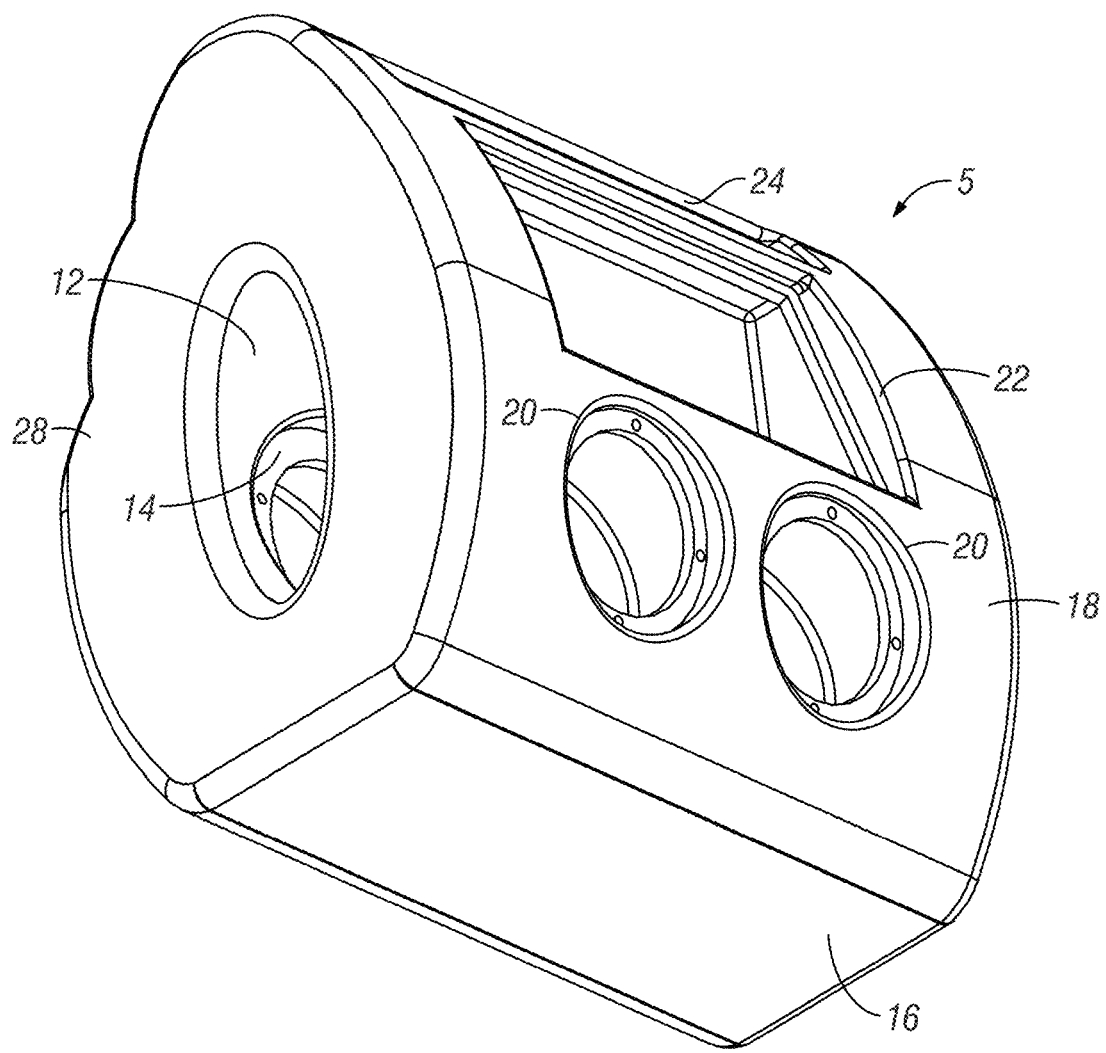
FIG. 1 shows a perspective view of a speaker housing for use in a speaker system according to one embodiment of the present invention viewed from a display unit side.

Various embodiments of the present disclosure will be described in detail with reference to the drawings, wherein like reference numerals represent like parts throughout the several views. Reference to various embodiments does not limit the scope of the disclosure. Figures represented herein are not limitations to the various embodiments according to the disclosure and are presented for exemplary illustration of the disclosure.

DETAILED DESCRIPTION OF THE INVENTION

Aspects of the invention disclosed herein may include a speaker system configured with a housing containing one or more interior speakers within an acoustic tunnel. More specifically, according to one embodiment, the present invention is a wireless, water-proof, solar powered smart speaker system with a display unit.

One unique aspect of this invention is the shape and form of the housing 5 which can best be seen in FIG. 1. Rather than the typical rectangular, pill, or spherical shape, which requires the speakers to be on the outside and can result in inferior sound quality performance, this invention discloses a housing 5 with a form designed to hold at least one speaker inside the housing for a better sound distribution system. The housing 5 comprises a type of elongated tear drop shape and includes a hollowed internal acoustic tunnel 12 extending from one end portion 28 to the other 30 (see FIG. 2). This tunnel 12 creates a cavity through the length of the speaker housing 5. The tunnel 12 includes one or more speaker openings 14 that are each adapted to have a speaker mounted with the speaker facing into the tunnel 12. Because the speakers are intended to be inverted and placed inside the housing, it allows the sound quality to be improved through acoustic resonance. The size, shape, and materials of the tunnel 12 as well as the location of the speaker mounting openings 14 may be varied to change the sound characteristics of the housing 5. In particular the ratio of the size of the opening to the length of the tunnel may be varied to create acoustic resonance that amplifies the sound of desired frequencies. The housing 5 has a lower base 16 adapted to be supported on an upward facing surface, such as a counter, table, floor, or the ground. In the embodiment shown, the lower base 16 is a generally flat elongated rectangular surface. It may be desirable to include feet (not shown) that may be molded-in or attached near the corners of the rectangle to provide a small space between the base 16 and the support surface on which it is set.

A first side portion 18 of the housing 5 extends generally upwardly from the base 16. The first side portion 18 includes at a lower portion external speaker openings 20 that are adapted to receive outward facing speakers (see FIG. 5). While two such openings 20 are shown, any number of openings may be provided. An upper portion of the first side portion 18 may include an opening 22 for mounting a display screen (see FIG. 5) that can be used to control and interface with the speakers in a manner that is described in more detail below. A handle recess 24 may be provided near the top edge of the first side portion 18 to facilitate carrying and placing a speaker system that uses the housing 5.

The housing may be formed from injection molded plastic pieces that snap together and may be secured with additional fasteners, such as threaded screws or the like in a known manner. For example, the housing may comprise, in some embodiments, four injected molded pieces that are put together. However, fewer or more components are also to be contemplated.

It is contemplated that the housing 5 can take a variety of different forms and is not limited to the raindrop or teardrop shape as shown in the figures. It is also contemplated that the housing can be made from a variety of materials or combination of materials. Exemplary examples include a type of wood or a thermoset plastic coated with rubber, but the housing material is not limited to these. Foams, rubbers, silicones (e.g., coatings), vinyl, leather, metals, or some combination of the same may be used. As will be understood, according to at least some aspects of the disclosure, the invention may be buoyant such that the material chosen allows for the speaker to float. Thus, it is further contemplated that the speaker housing comprises or otherwise be covered in a generally waterproof material. To aid in keeping the housing generally upright, a weight or weighted member may be included in a lower portion of the housing to maintain a desired orientation of the speaker or speaker housing system.

Figure 2:
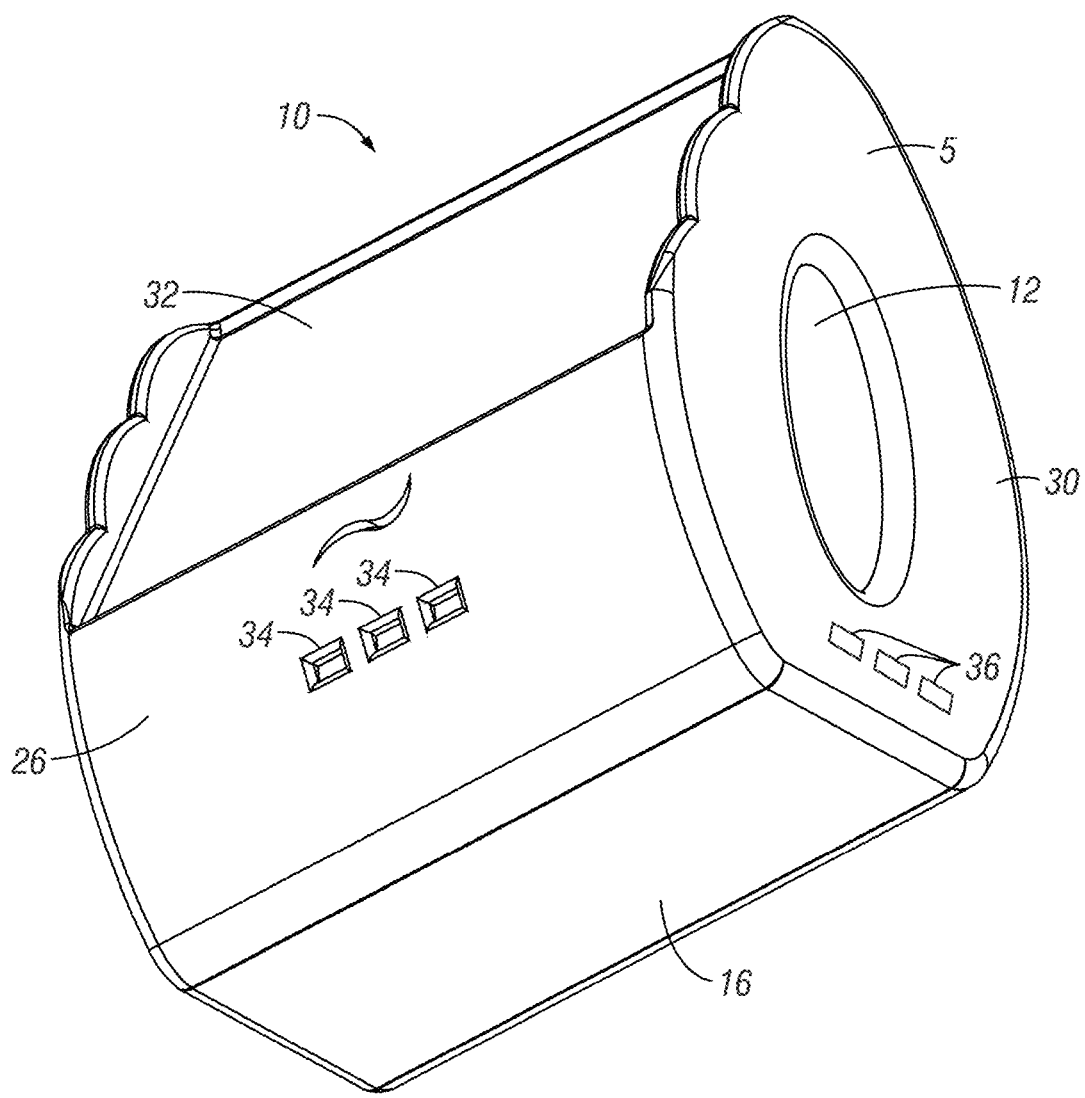
FIG. 2 shows a perspective view of a speaker system utilizing the speaker housing of FIG. 1, viewed from a solar panel side.

FIG. 2 shows a speaker system 10 that incorporates the housing 5 of FIG. 1. FIG. 2 shows a second side portion 26 that extends generally upwardly from the lower base 16 opposite from the first side portion 18. An upper portion of the second side portion 26 may include one or more solar panels 32 that may be angled to face at least somewhat upwardly to better receive light at a direct angle. Indicator light openings 34 are provided to provide feedback to a user regarding on/off status, battery life, and Bluetooth or Wi-Fi connection. Tactile buttons and light indicators are provided to provide feedback to a user regarding on/off status, treble/bass adjustments (or other audio adjustments and/or tuning), and Wi-Fi/Telecom Wireless connection. A second end portion 30 is opposite from the first end portion 28 and extends generally upwardly from the base 16 between the first and second side portions 18 and 26. Inlets 36 may be provided in one or both of the end portions 28 or 30 as shown in FIG. 2 to receive, for example, USB cables or sticks, charging cables, HDMI cables, auxiliary cables, and power cables.

Figure 3:
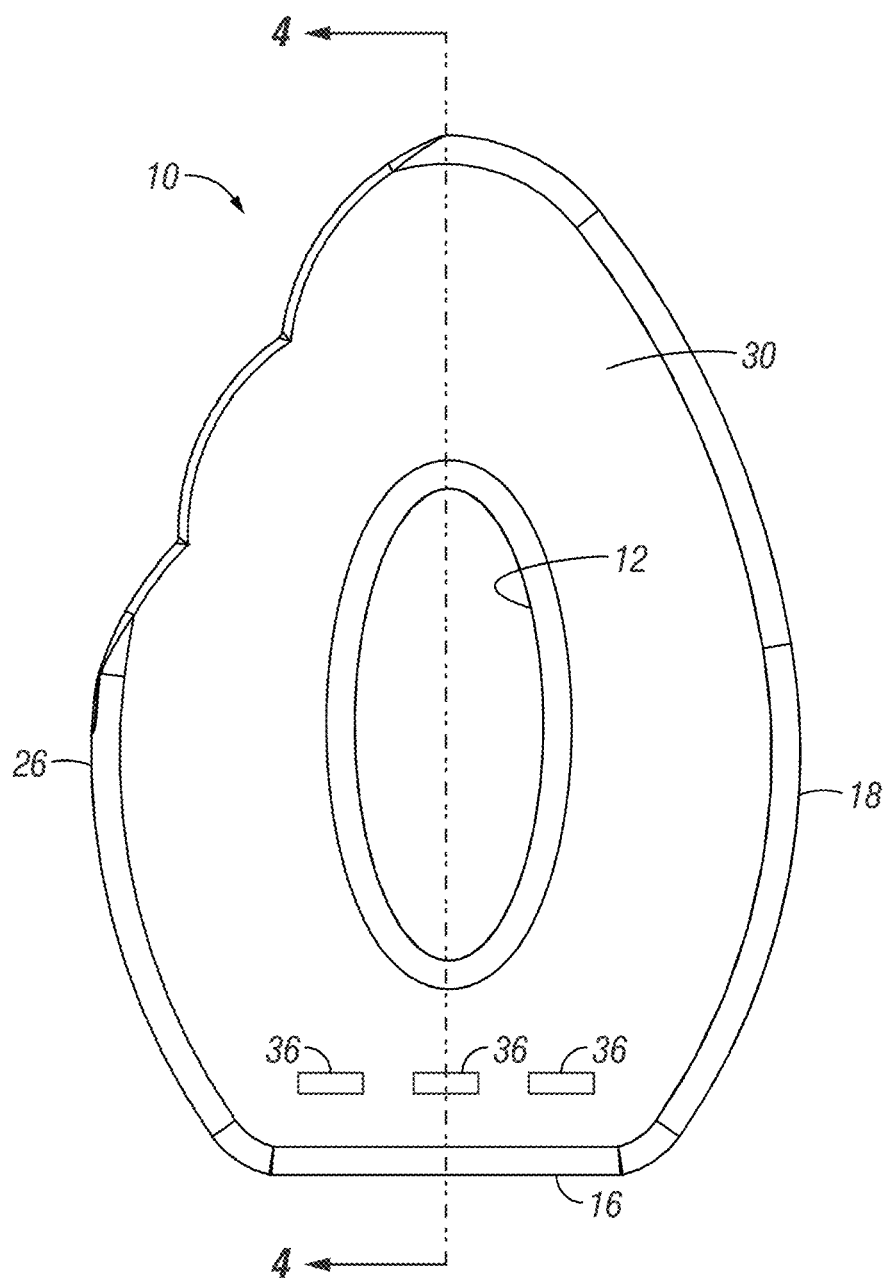
FIG. 3 is an end elevation view of the speaker system of FIG. 2.

FIG. 3 is a side elevation view showing the second end portion 30 looking directly through the tunnel 12. In the embodiment shown in FIG. 3, the tunnel 12 has an elliptical-shaped opening, and forms a generally elliptical right cylinder. This elliptical cross-section has been found desirable both in terms of sound quality and aesthetic appeal. Other cross-sectional shapes such as tear drop, egg, or pear are also contemplated as well as other less symmetrical shapes.

Figure 4:
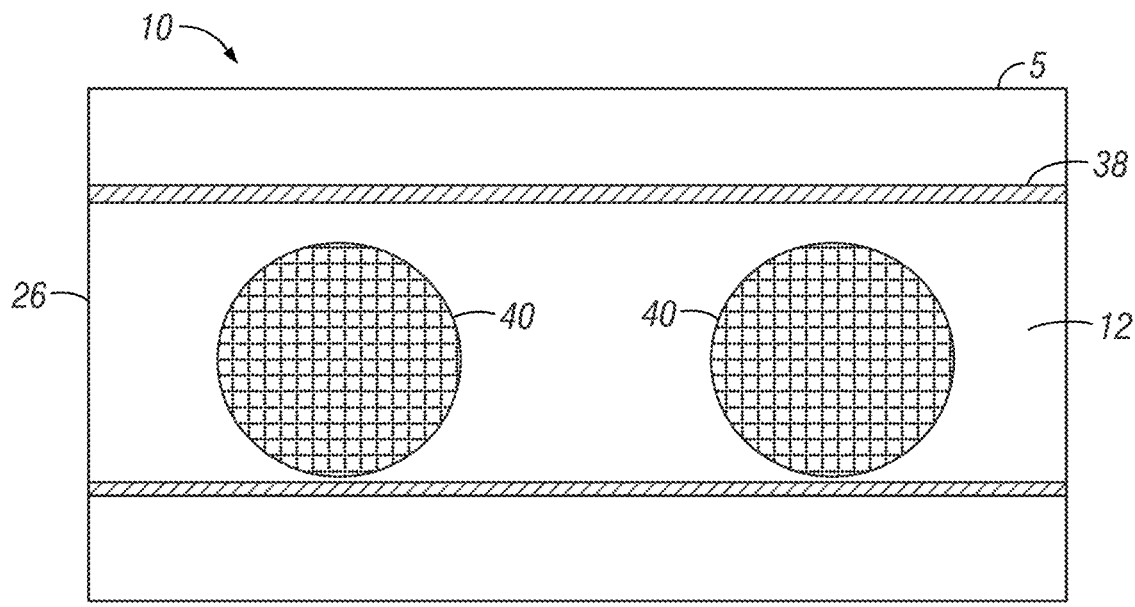
FIG. 4 is a cross sectional view of the speaker system of FIG. 3 showing a surface of the acoustic tunnel within the speaker housing.

The tunnel 12 may be formed by the shape of the housing 5 itself or may be a separate tube 38 (see FIG. 4) having the desired cross-sectional shape, effective diameter and length. The effective diameter and length of the tube 38 can be used to control the acoustic resonance of the tube 38 in order to enhance and amplify desired sound frequencies. For example, it is noted that the invention may amplify the low frequency nodes and/or antinodes produced by the subwoof output. The material of the tube 38 or housing 5, may also affect the sound quality depending upon its sound reflecting and absorbing properties. The tube 38 may also be chosen to have a different and complementary color as compared to the color of the housing 5 to provide a desired and aesthetically pleasing accent. FIG. 4 shows the edges of the tube 38 as being square to the end portions 28 and 30 of the housing 5, but in practice it may be desired to round the ends for aesthetic reasons, and to avoid sharp edges.

As seen in FIG. 4, internal speakers 40 are mounted facing inwardly into the tunnel 12. The orientation of the speakers 40 into the tunnel 12 facilitates acoustic resonance. In the embodiment shown, two speakers 40 are shown; however, one or more than two speakers may be used. In the embodiment shown, the speakers are mounted in the second side portion 26 because the solar panels 32 have less depth and take up less space than the display screen.

Figure 5:
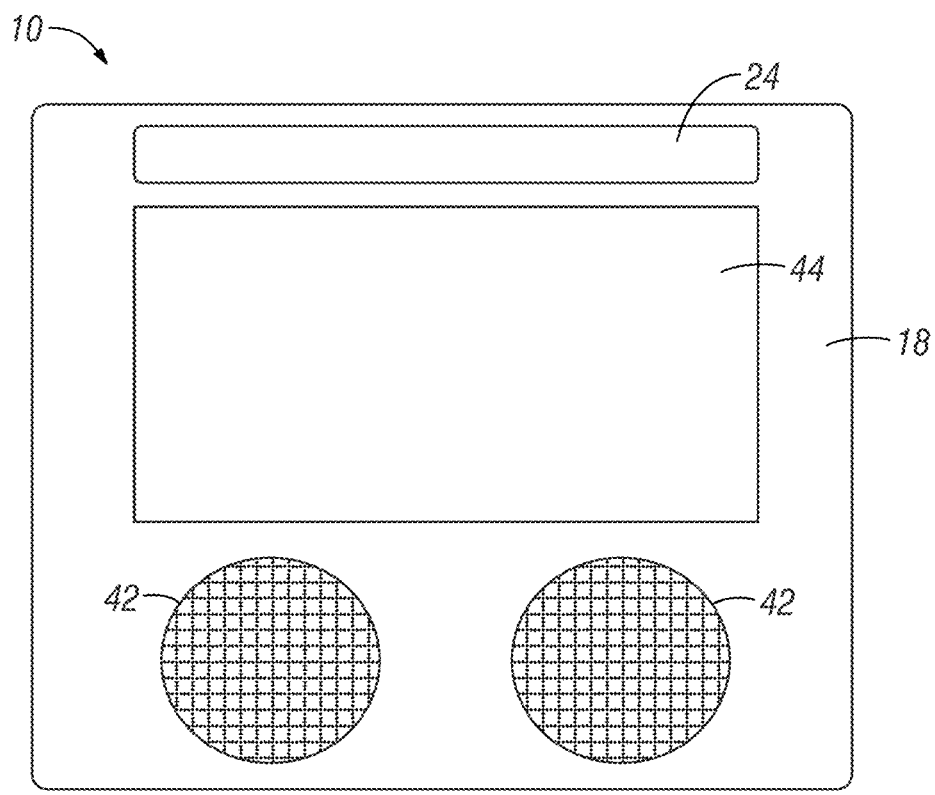
FIG. 5 is a front elevation view of speaker system according to one embodiment of the present invention.

FIG. 5 is an elevation view of the first side portion 18. Speakers 42 are provided at a lower portion of the first side portion 18. A display screen 44 is mounted at an upper portion of the first side portion 18. The display screen 44 is used to display information about the speaker system 10. The display screen 44 is preferably a touch screen. The touch screen 44 is connected to a computer processing unit (CPU) (not shown). The CPU includes a non-transitory memory. The memory can be used to down load and store audio files, such as MP3 songs and replay them at the times and in the orders selected by a user. The handle 24 may be formed integrally with the housing such that a cavity or portion of the housing is removed in order to provide for a grasping location. Still further, a separate handle could be affixed or otherwise attached to one or more portions of the speaker housing 5 to allow for easier carrying thereof.

The display unit 44 is attached to the outside of the housing 5 and provides easy access and control to users. It should be appreciated that the display unit may also be referred to as a user display, user interface (human-machine interface, HMI), music or other sound source, or generally any other connotation that indicates that the display unit will aid in controlling at least some operation of the speaker system, e.g., music application and/or song selection operations. The display unit may also be referred to as a user interface unit, monitor and input unit, monitor unit, interactive display, or other relative term. The display unit 44 may also consist of a mount with the ability to secure an external device such as a tablet, cell phone, or generally any other handheld, portable, permanent, or other device.

The display unit 44 can take many forms and can generally be considered or can comprise an intelligent control. For example, an intelligent control is generally considered to be a computer readable medium or computing device or an apparatus including a processing unit. Examples of such units can be tablets, cell phones, or generally any other handheld, portable, permanent, or other device which may include a central processing unit and a graphical unit interface (GUI). The graphical user interface may also be a user interface without the graphics required. The display unit includes combinations of hardware, and software and/or firmware that are operable to, among other things, control operation of the speaker and/or to provide a source for music or other audio files to be transmitted via the speaker. The display can include a user interface module that can include a display (e.g., a primary display, a secondary display, etc.) and input devices (e.g., touch-screen displays, a plurality of knobs, dials, switches, buttons, etc.). More specifically, the display can be, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, or a reflective bistable cholesteric display (i.e., e-paper).

The display unit can also include a memory for storing instructions, audio files, and/or the like. The memory can include combinations of different types of memory, such as read-only memory ("ROM"), random access memory ("RAM") (e.g., dynamic RAM ("DRAM"), synchronous DRAM ("SDRAM"), etc.), electrically erasable programmable read-only memory ("EEPROM"), flash memory, a hard disk, an SD card, or other suitable magnetic, optical, physical, or electronic memory devices.

Figure 6:
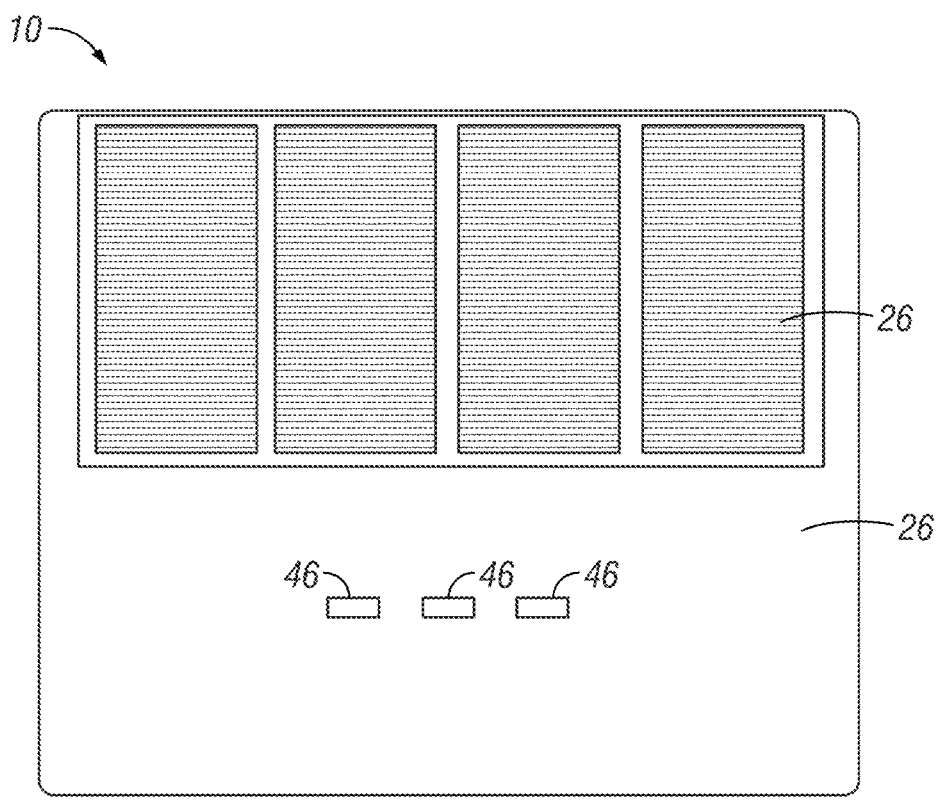
FIG. 6 is a rear elevation view of the speaker system of FIG. 5.

FIG. 6 is an elevation view of the second side portion 26. Solar panels 26 are mounted at an upper portion of the second side portion 26. The solar panels 26 can comprise any known composition of materials used, such as crystalline silicon (c-Si) solar cells made of multicrystalline and monocrystalline silicon. However, the exact composition of the solar panels 26 is not to be limiting on the present disclosure. The solar panels will create the electricity to power the speakers 40, 42, as well as possibly other devices of the speaker system. Therefore, electrical wires may be included that connect the solar panels 26 to the speakers, a battery, the display unit, an output port, or anywhere else on or in the speaker system 10 that may require electricity. Still further a control panel, chip, or other device (not shown) can be included to provide the necessary conversion into desired electrical output, or the converter can be included with the solar panels themselves. Tactile buttons and light indicators 46 may also be provided in the second side portion 26.

Figure 7:
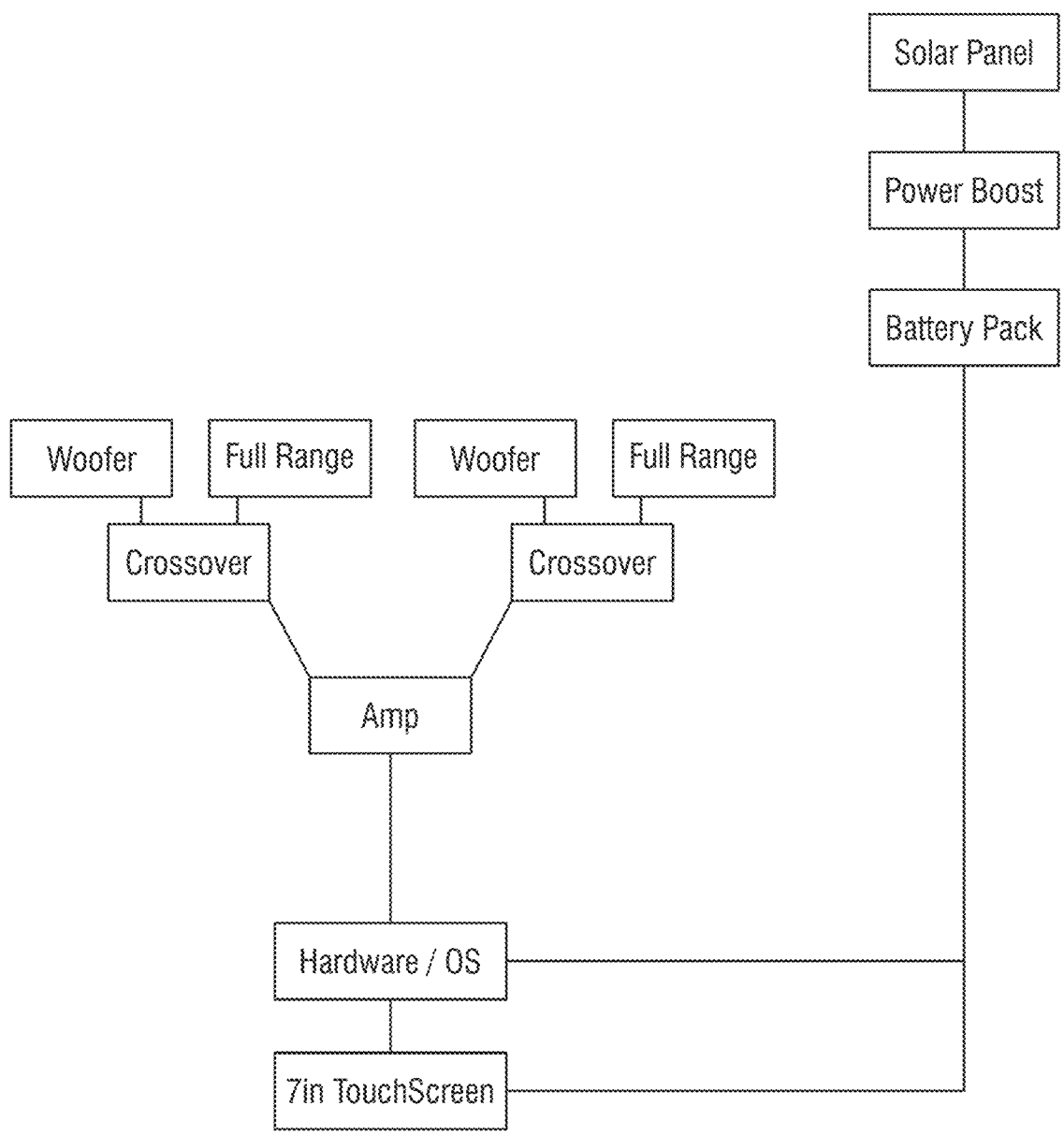
FIG. 7 is a schematic of the operational components of a speaker system according to one embodiment of the present invention.

FIG. 7 is a schematic of the operational components of a speaker system 10 showing several features of this disclosure. The solar panels 32 may be connected to a power boost that provides power to a battery pack that stores the power. The battery pack is connected to the display unit 44, which may be a seven-inch touch screen and is connected to the CPU. The CPU is programmed with an operating system and logic to permit control of the speakers 40, 42, as well as control of the music application(s). The operational components may also include receivers and transmitters to permit communication via, Bluetooth, Wi-Fi, and telecommunications protocols such as 3G, 4G, and 5G. One aspect of the present disclosure is a Wi-Fi Operating system and/or telecommunication operating system (Android Operating System) with a user-friendly layout on the display unit. This provides the user or operator an opportunity to play music directly from the display unit. It is acknowledged that Wi-Fi is not always available, in which case the present invention provides the ability for users or operators to play uploaded music via the internal storage or via the telecommunication connectivity. Additionally, it is acknowledged that the design, structure, music applications and size of the Wi-Fi operating system and/or telecommunication operating system shown are only examples and there are many different ways each aspect of the Wi-Fi Operating system and/or telecommunication operating system could be changed or modified.

It is contemplated that the speaker system could be communicated to in any wireless fashion, such as any wireless communication. This can include, but is not limited to, Bluetooth, Wi-Fi, cellular data, radio waves, satellite, or generally any other form of wireless connection.

Bluetooth allows for a user to connect with a speaker system using some form of music source. In this way, a user can select the audio preferred and stream through a speaker system some distance away. An auxiliary cable similarly allows a user to stream music through a speaker system while connected to some form of music source, with the addition of a cable that allows for the transfer of audio signals. However, both of these methods require a user to have an additional source for music nearby in order to stream audio. An auxiliary cable limits the user's device to be no further than the length of the cable away from the system, and Bluetooth requires a user's device to be within range of connection to the speaker system.

An alternative method of streaming audio includes the use of Wi-Fi capabilities. Wi-fi can be used to stream audio in a variety of ways. First, some form of music source connected to the same Wi-fi provides a means for selecting and streaming the audio through the system. Second, a mobile application either on a device or the speaker system itself connected to Wi-Fi would also provide a means for streaming audio. Finally, there may be additional ways to utilize Wi-Fi in streaming audio through a speaker system. However, streaming audio through Wi-Fi generally requires an additional music source, and can only be used in locations that are Wi-fi accessible.

Still further, it should be appreciated that the display unit and speaker be connected via a network, which can include, but is not limited to, a wide area network ("WAN") (e.g., a global positioning system ("GPS"), a TCP/IP based network, a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a Digital Enhanced Cordless Telecommunications ("DECT") network, a Digital AMPS ("IS-136/TDMA") network, or an Integrated Digital Enhanced Network ("iDEN") network, etc.), although other network types are possible and contemplated herein.

The network can be a local area network ("LAN"), a neighborhood area network ("NAN"), a home area network ("HAN"), or personal area network ("PAN") employing any of a variety of communications protocols, such as Wi-Fi, Bluetooth, ZigBee, near field communication ("NFC"), etc., although other types of networks are possible and are contemplated herein.

While wireless connections are generally disclosed herein, the display unit 44, power supply (solar panels 32), and/or speakers 40, 42 can also be connected in a hardwired manner, such as through the use of ethernet or the like.

Moreover, an additional aspect of the invention is the ability for users to use the backup power provided by a lithium or other type of battery when there is not enough solar power available. This would allow for users to have continued use of the solar powered speaker system either well into the night or in places where sunlight is not available. The solar panels could divert at least some of the energy they collect to the battery to use as a storage as well. The energy stored in the battery or batteries could be used instead of the solar panels or in conjunction with the panels, such as to provide additional electricity to one or more components (e.g., the display unit, an electrical output port, etc.). Thus, it should be appreciated that one or more batteries, such as a battery pack, be included as part of the speaker system.

An even further aspect of the invention is the ability to charge external devices through an external or output port, such as a USB port 36 on the outside of the housing 5. This gives users a greater opportunity to take advantage of the speaker's ability to be used in a variety of different places and settings, without needing access to power. This results in greater freedom and mobility for users with all of their electronic devices. For example, the housing 5 can include connections for wired connection to the housing. Such a wired connection can be a cable for charging the unit, a cable for connecting the unit to an implement, wires for connecting the unit to an external device, such as for transmitting data or any other information from one to the other, and/or any other type of wired connection.

Still further, it is contemplated that the speaker system 10 can be configured to receive inputs from a plurality of devices (e.g., tablets, phones, apps, music files, streams, etc.). Such non-limiting inputs could be in the form of mp3s, WAVs, AIFFs, AU, PCMs, FLACs, AACs, OGGs, MPEG-4s, etc. This could also be in the form of direct streaming via a source, such as, but not limited to, Pandora, Spotify, Apple Music, Napster, SiriusXM, Amazon Music, Deezer, iHeart-Radio, TIDAL, Google Play Music, TuneIn Radio, YouTube Music, Shazam, Vevo, Soundcloud, Instagram, Facebook, Slacker Radio, or generally any other software for directing an audio file. The display of the speaker could include, as an aspect of the app or software residing therein, allows a user of a device to send one or more music files to the speaker, where the music files will be queued. The device is able to receive music files from multiple users and multiple devices and will queue the inputs based, for example, on a time-received manner (first-in, first-played). The display will have a master override that will allow at least one user to control the queue to rearrange the songs, to skip songs, to add in songs, or otherwise manipulate the queued song inputs. As the device reaches the next song, it can wirelessly communicate with whatever device is associated with the next audio or visual file to stream the file from the inputting device.

Figure 8:
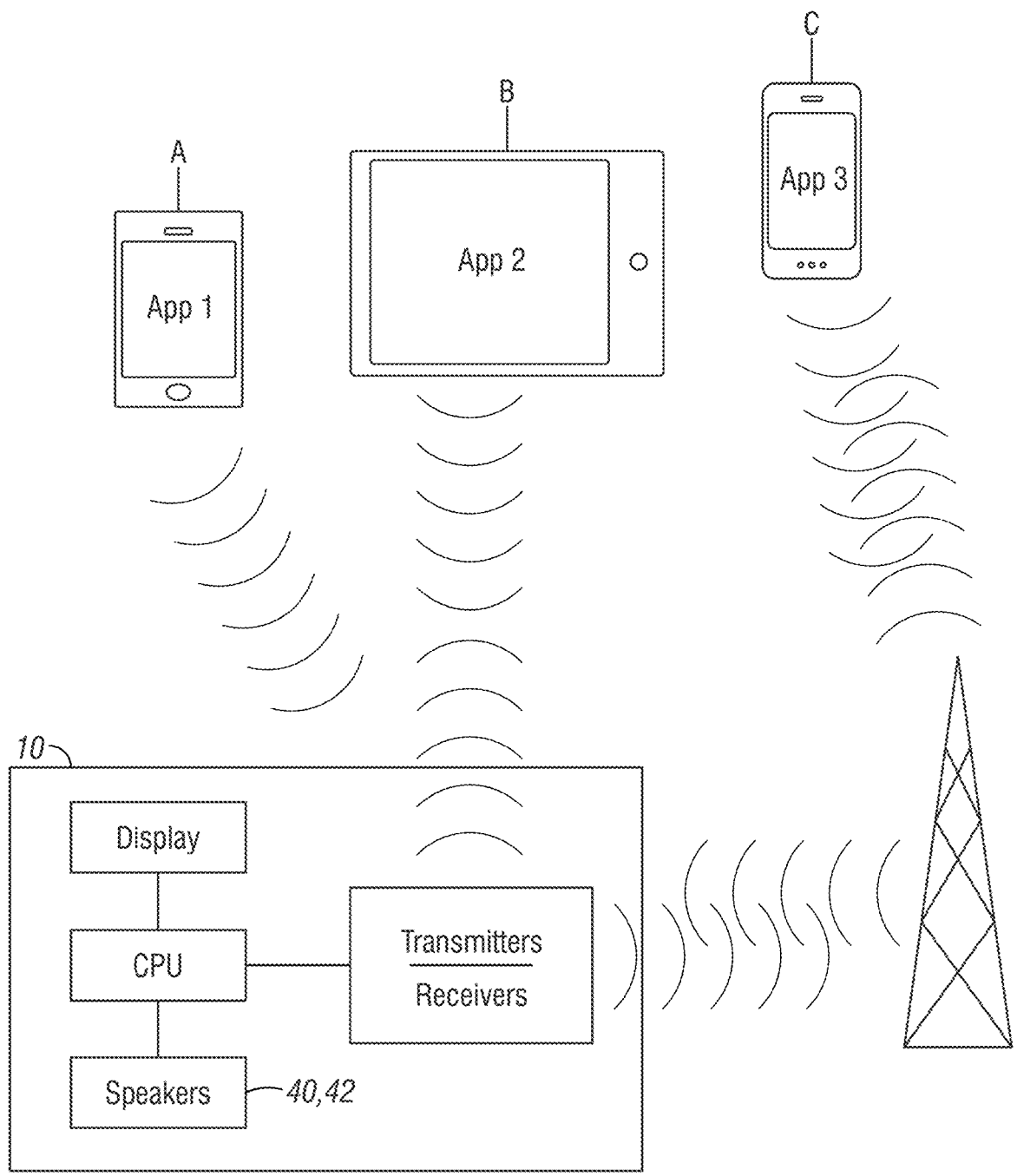
FIG. 8 is a schematic showing the speaker system in communication with external devices that are utilizing different commercial music streaming services to queue and playback music in a desired order.

For example, as seen in FIG. 8, three users (A, B, and C) could be listening to the speaker system 10 in proximity with one another. Each user can connect their respective phone or other electronic device (tablet, computer, handheld, server, etc.) wirelessly or wired with the speaker and the display/control system thereof. The software on the speaker and/or the user interface will allow the users to designate songs in the form of audio files with the speaker. For example, user A could associate audio files from Apple music to play on the speaker, user B could associate songs from Spotify, and user C could associate songs from Napster and TIDAL. The songs will be designated and shown in a queue on the display unit of the user interface. When a song is queued up to be played, the speaker can wirelessly communicate with the associated device to play the audio file, such as streaming via the device. For example, when a song from user A's Apple music is ready to be played, the speaker and device (e.g., phone) will communicate to allow the speaker to stream the song from the phone without ever creating a copy of the audio file on the speaker or user interface. The audio file will remain with whatever device is connected to the speaker and will stream therefrom so that no copy of any audio file is created on another device. If the next song queued is from user B's laptop in the form of a Napster audio file, the speaker will create a communication with the laptop and will stream therefrom the audio file to play via the speaker. When songs from user C's device are queued up, the speaker will then connect directly to that device to play the songs as if user C's device is directly connected to the speaker, without having to disconnect or otherwise disassociate any of the other inputting devices from user A or B. If a streaming service such as Pandora is being played, the streaming could be interrupted when another user queues up a single or multiple songs. In addition, any of the queuing could be overridden by a master controller, which could be a designated device of one of the users, or could be at the user interface of the speaker itself. This would provide controls for adjusting the queue list, skipping songs, replaying songs, or otherwise manipulating the listening experience.

This unique feature will allow multiple users to add songs from their own devices, without having to use a common device to compile songs. The compilation of the songs will be organized by the user interface of the speaker, which will work directly with the inputting device to stream the music therefrom. The feature could allow multiple devices to be connected, which reduces the amount of time required to switch when users want to play songs from a different device with a common speaker.

Additionally, an aspect of the present invention includes an ability for the speaker to be waterproof provided the material of the housing allows it to do so. This would allow the user to bring the speaker into different environments, locations, and weather. Even further, the present invention contemplates allowing the speaker to float, which prevents the loss or damage resulting from a submerged speaker and would allow a user to have easy access to the speaker even when in water.

Therefore, a speaker system 10 including solar panels 32 for absorbing solar power to electrically power a speaker system 10 is herein disclosed. The system can include inward facing speakers 40 that provide an enhanced sound within a hollowed cavity 12. A control unit and/or audio source can be connected to provide audio to be played via the speakers. Additional components obvious to those skilled in the art are further to be considered as part of the disclosure, and the exemplary embodiments herein disclosed are not to be limiting on the invention.

I claim:

1. A portable speaker system comprising:
a housing comprising a first end and a second end with an acoustic tunnel extending therebetween, the acoustic tunnel being formed by a wall from the first end to the second end that separates and interior of the housing with the exterior of the acoustic tunnel;
at least one internal speaker extending through a portion of the wall of the acoustic tunnel to face into the exterior portion of the wall to create acoustic resonance;
at least one external speaker extending outwardly from a first or second side portion of the housing, said first or second side portion extending at least partially parallel to the acoustic tunnel; and
an interface at the first or second side portion, said interface electronically connected to the at least one internal speaker and the at least one external speaker.

2. The portable speaker system of claim 1, wherein the interface comprises a display screen located on the first side portion of the housing.

3. The portable speaker system of claim 2, further comprising a computer processing unit including a non-transitory memory within the housing, the computer processing unit being operably connected to the display screen, the at least one internal speaker, and the at least one external speaker.

4. The portable speaker system of claim 3, further comprising a receiver and transmitter to wirelessly communicate with a first external user device, a second external user device, and a third external user device, the receiver and transmitter being operably connected to the computer processing unit, and further wherein the computer processing unit is adapted to queue audio signals from each of the three external user devices in a desired order and play audio signals received from each of the three external devices in the desired order without creating a copy of an audio file.

5. The portable speaker system of claim 4, further comprising additional receivers and transmitters to permit communication via Bluetooth, Wi-Fi, or cellular telecommunication.

6. The portable speaker system of claim 4, wherein the first external device sends an audio signal from a first commercial music streaming app, the second external device sends an audio signal from a second commercial music streaming app, and the third external device sends an audio signal from a third commercial music streaming app.

7. The portable speaker system of claim 1, further comprising at least one solar panel located at an upper portion of the second side portion of the housing.

8. The portable speaker system of claim 1, wherein the interface comprises a mount positioned at the housing.

9. The portable speaker system of claim 8, further comprising a removable interface unit positionable at the mount to position and remove an interface.

10. The portable speaker system of claim 9, wherein the removable interface unit comprises one of:
a. a tablet;
b. a phone;
c. a handheld;
d. a smart device; or
e. a portable device.

11. The speaker system of claim 9, wherein the interface is connectable to a cellular network, local area network, wide area network, home area network, personal area network, or a combination thereof.

* * * * *